March 21, 1933.   R. PUDELKO   1,902,045
MAXIMUM AND TOTAL DEMAND METER
Filed Aug. 24, 1927   2 Sheets-Sheet 1

Inventor:
R. Pudelko
By John D. Morgan
Attorney

March 21, 1933.   R. PUDELKO   1,902,045
MAXIMUM AND TOTAL DEMAND METER
Filed Aug. 24, 1927   2 Sheets-Sheet 2
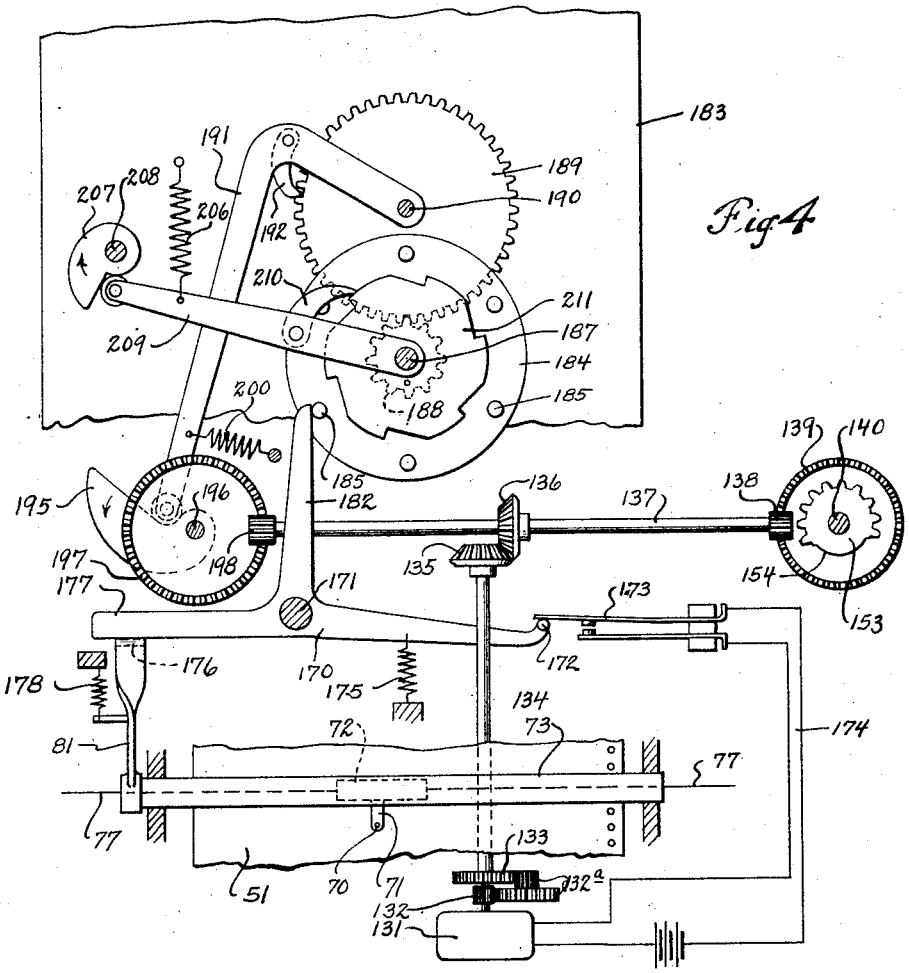
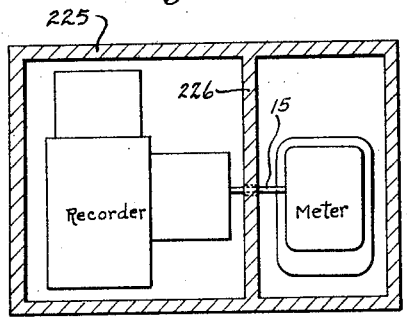
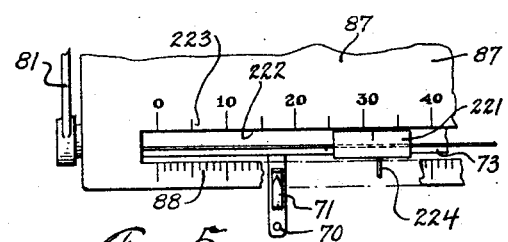
INVENTOR.
R. Pudelko
BY John D. Morgan
ATTORNEYS.

Patented Mar. 21, 1933

1,902,045

UNITED STATES PATENT OFFICE

RICCARD PUDELKO, OF ZUG, SWITZERLAND, ASSIGNOR TO LANDIS & GYR, A.-G., A JOINT STOCK COMPANY OF SWITZERLAND

MAXIMUM AND TOTAL DEMAND METER

Application filed August 24, 1927. Serial No. 215,096.

The invention relates to maximum and total demand energy metering means, and more particularly to electricity meters for measuring and recording maximum and total current consumption.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a diagrammatic fragmentary elevation of inner parts at the left of Fig. 1;

Fig. 5 is a fragmentary detail of a modified form of the indicating device; and

Fig. 6 is a sectional diagram of the mounting mechanism in the meter casing.

Figure 1:
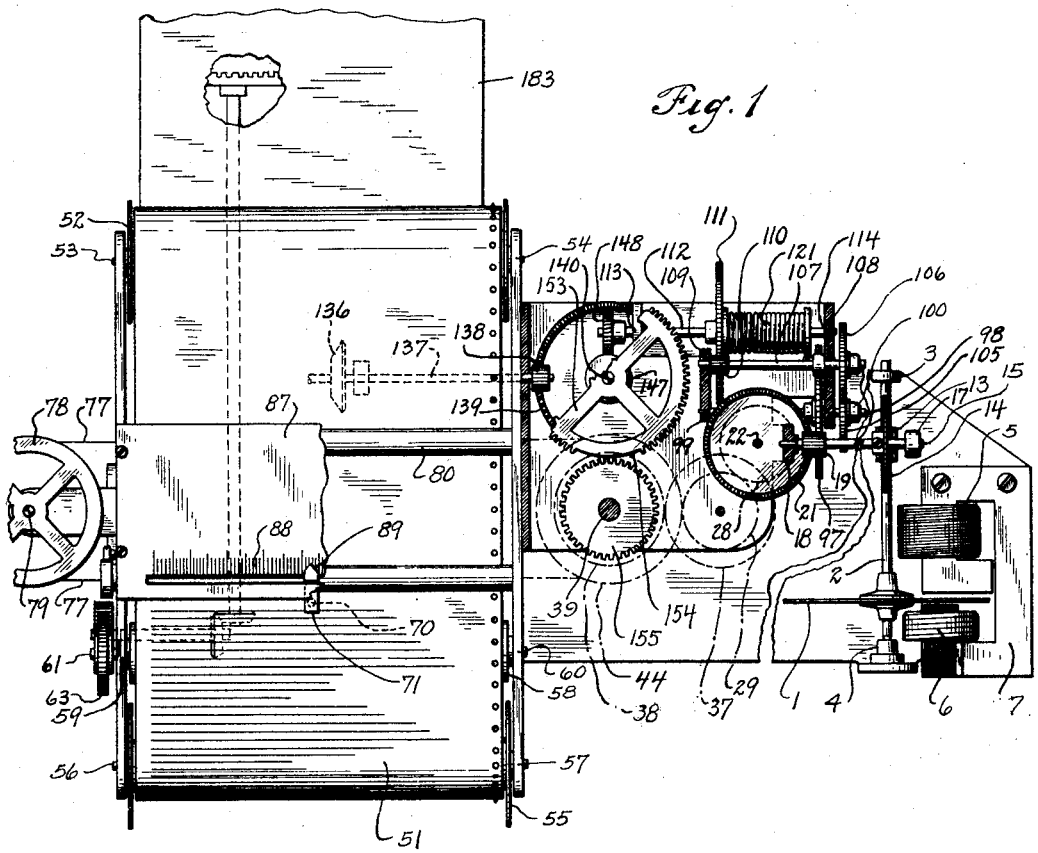
Fig. 1 is a partial front elevation at the left, and a vertical section at the right of the line 1—1 of Fig. 2.
Figure 3:
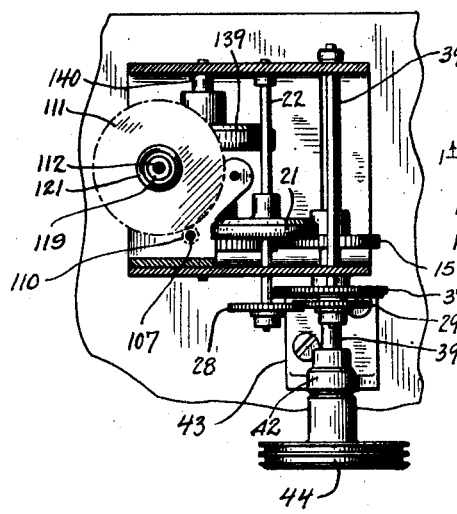
Fig. 3 is a vertical transverse section taken on the line 3—3 of Fig. 2.

The present invention in certain of its features is in the nature of an improvement over that of my copending application, Ser. No. 708,309, filed April 22, 1924; but in many of its features it is of more general application.

The invention is directed to producing a maximum demand and total demand metering and recording mechanism, which is of simple, sturdy and compact construction, and which is sensitive and reliable in operation, and it is further directed to producing in such a mechanism a graph or record of the demand over continuously successive predetermined and relatively brief periods of time, and the total demand over the entire or relatively long period of time, in connection with the indicating means of the consumption during each of the recurrent predetermined periods.

The preferred embodiment of my invention in its broader aspects comprises a meter-driven or meter-controlled mechanism operating for the predetermined periods, and at the end of each period recording the total demand during the period, and preferably power devices for driving said mechanism and utilizing the electricity meter merely as a governing means for the driving means to effect the true and accurate recordation and indication of the power consumption. Power means are also provided for recording the result at the ends of the predetermined power-consumption measurement periods, this means operating under the control of a master clock, and without interfering with the operation of the precedingly described mechanisms. The master clock also preferably controls the winding or other energy storing operation of the driving means for the metering mechanism.

It will be understood that the foregoing general description and the appended detailed description as well are illustrative and exemplary of the invention but are not restrictive thereof.

Referring now to the embodiment of the invention, illustrated by way of example in the accompanying drawings, the electricity meter may be of any known or suitable form, and it is shown herein as comprising a meter disc 1, fixed on a shaft 2, journaled in the bearings 3 and 4. Suitable pressure coils 5 and current coils 6 are shown mounted on a core 7. The meter may be provided with a registering mechanism of any known or suitable form, if desired.

The connections from the meter to the periodically operating energy measuring and recording means may, so far as concerns the broader features of the invention, be utilized to drive said mechanism directly from the meter, but in accordance with other aspects thereof, the meter is connected to merely govern the speed of a power-drive, and this latter form is utilized in this embodiment. As so embodied, the worm 13 is fixed on meter shaft 2, and in engagement therewith is a worm-wheel 14, fixed on a shaft 15, which shaft is journaled in bearings 17 and 18 on the frame structure. Fixed on shaft 15 is a pinion 19, which meshes with a crown-gear 21, fixed on a shaft 22, which is journaled at 23 and 24 in the machine frame, one end of the shaft 22 extending outside of the frame. Fixed on said exterior end of the shaft 22 is a gear-wheel 28, which meshes with a gear-wheel 29 fixed on a shaft 30, which shaft is journaled at 31 and 32 in the machine frame. The gears 28 and 29 may be interchangeable or replaceable so as to provide any speed ratio variation that may be desired. A spur-gear 37 is mounted friction tight on the shaft 30, said gear meshing with a gear-wheel 38, fixed on a shaft 39, which is journaled at 40 and 41 in the machine frame, and at 42 in a bracket 43, fixed on the machine frame. Fixed also on the shaft 39 is a driving-pulley 44, for operating the indicating and recording means.

In the embodied form or recording means, I have utilized the form wherein parallel lines were drawn on a sheet moved by clockwork, the lines representing the total energy consumption during successive predetermined time intervals. As embodied, a record-receiving sheet 51 is mounted upon and unwound from a supply roll 52, journaled at 53 and 54 in the machine frame, and is wound upon the driven roller 55, journaled at 56 and 57. The sheet 51 runs over an intermediate roller 58, journaled at 59 and 60 in the machine frame, this roller being provided with sprocket teeth which engage spaced perforations in the side edge of the sheet, in a known manner, to insure registration and accurate feed of the sheet. Fixed to the shaft 61 of roller 58 is a gear-wheel 63, which is driven from a suitable clock mechanism not shown, and thus the sheet 51 is moved uniformly by the time mechanism.

The embodied form of recording means comprises a stylus or other marker 70, fixed on an arm 71, which arm is fixed to a guiding cylinder 72. Cylinder 72 slides within a slotted and oscillatable guiding tube 73, the arm 71 extending outwardly through the slot in the tube. Fixed to either end of the guide 72 is a cord or other flexible member 77 which runs over the pulley 44, and over an idle pulley 78 journaled at 79 on the frame beyond the other side of the tube 73. The idle return reach of the cord 77 runs through a tube 80 mounted in the machine frame. During the metering of the power for the successive predetermined time periods the stylus makes no record, and at the end of said period is brought against the record sheet and makes an instantaneous record of the energy consumption for the just ended predetermined period. In the embodied form of mechanism for moving the stylus to and from the record sheet, an arm 81 is fixed to an end of the tube 73, this arm being operated by a cam mechanism connected to the clock mechanism (not shown).

In the embodied form there is also provided indicating means showing the energy consumption during any given period, and as embodied a plate 87 is mounted on the machine frame along the path of travel of the recording mechanism. This plate is provided with a scale 88, indicating energy units, and a pointer 89 fixed to the movable recording mechanism is in indicating relation with the scale 88.

In accordance with one feature of the invention, and as already indicated, power-driven means are provided for moving the recording means proportionately to the power-consumption during the successive predetermined periods, the meter being used merely to govern the driving means to correctly measure or indicate the energy consumption. In the embodied form of said power-driven means, a gear-wheel 97 is in mesh with the pinion 19, already described, this gear-wheel being fastened on a shaft 98, which is journaled at 99 and 100 in the frame structure. Fixed also on shaft 98 is a gear-wheel 105, which meshes with a gear-wheel 106, fixed on a shaft 107, journaled at 108 and 109 in the machine frame. A pinion 110 is fixed on the shaft 107, and meshes with a gear-wheel 111, which gear-wheel is mounted loosely on a shaft 112, journaled at 113 and 114 in the frame structure.

Figure 2:
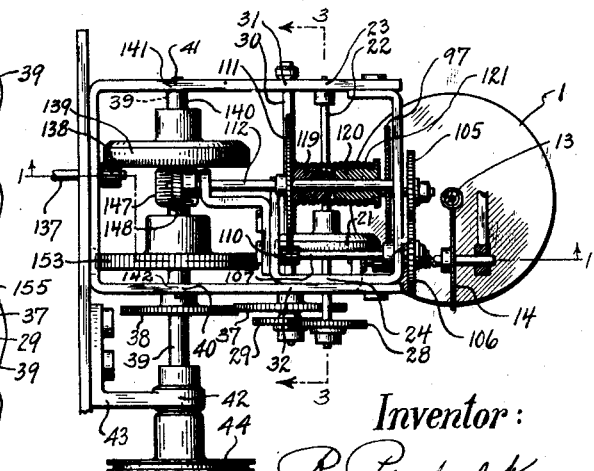
Fig. 2 is a full top plan of the mechanism shown in vertical section in the right hand part of Fig. 1.

The gear-wheel 111 is provided with a relatively large, rearwardly-projecting grooved hub 119, and adjacent thereto is a grooved sleeve 120, fixed on the shaft 112. A helical driving spring 121 is in tight friction fit on the fixed sleeve 120 and on the hub 119 of the gear-wheel 111, whereby rotation of the shaft 112 will wind up the spring 121, and the spring 121 in turn will drive the wheel 111 frictionally under the conditions later to be described. The outer end of hub 119 is preferably reduced in diameter, as shown in section Fig. 2, to provide more efficient action of spring 121. It will thus be seen that when the shaft 112 is at rest, the spring 121 will tend to rotate the wheel 111, and will drive the pulley 44, but the rate of drive will be controlled by the meter disc 1, through the hereinbefore described connections, including the worm 13 and the worm-wheel 14, proportionally to the consumption of energy.

Means are provided by the invention for actuating the record-making mechanism at the end of the successive predetermined time periods, and in accordance with one feature of the invention, the same mechanism is utilized for winding the driving spring 121 for the recording mechanism. In the embodied form a motor 131 is provided, which is started and stopped from the controlling clock mechanism by any of the well-known or other suitable means (not shown). A pinion 132 on the motor shaft drives through speed reduction gears 132a, a gear-wheel 133, on a shaft 134, which is mounted in suitable bearings, not shown. Fixed on shaft 134 is a bevel pinion 135, which meshes with a bevel pinion 136, fixed on a shaft 137, on which shaft is fixed also a pinion 138. Pinion 138 is in mesh with a crown-gear 139, fixed on a shaft 140; journaled at 141 and 142 in the machine frame. On the shaft 140 is fixed a worm 147, which meshes with a worm-wheel 148, fixed on the shaft 112. Thus when the motor 131 is driving, through the connections just described, shaft 112 is rotated, and through the fixed sleeve 120, serves to wind the driving spring 121 for the recording mechanism.

Referring now to the embodied form of means for driving the recording mechanism to make the record upon the sheet 51, an interrupted spur gear-wheel 153 is fixed on shaft 140, and has the smooth or mutilated portion 154 (partially broken away in Fig. 1 to permit view of other parts). Gear-wheel 153 is adapted to pass into and out of mesh, by reason of the part 154, with a gear-wheel 155, fixed on shaft 39, and thus forms a intermittently operating driving connection from the motor 131 to the pulley 44, to move the recording device toward the left in Fig. 1 to make the energy consumption indicating mark e for a predetermined time period from the sheet 51.

The manner of operation of the mechanism just described will be understood from the preceding description of the structure and of the operation of the successive groups of mechanism, but may be summarized as follows:—

The mechanism may be considered as about to begin the energy measurement for one of the predetermined time periods, and the recording mechanism to be at the left of Fig. 1. The spring 121 will be wound and will drive the gear-wheel 111, which will drive through the pinion 109, gear-wheels 106, 105, and 97 on to the pinion 19, and from thence through the gears 28, 29, 37 and 38 to the driving pulley 44, which will carry the indicating mechanism along the tube 73 to the right. However, through the worm-wheel 14 and the worm 13, the motion will be in proportion to the energy-consumption as determined by the rotation of the meter disk 1. Due to the light load of the recording mechanism, the friction tight gear 37 will transmit the power on to the train of gears.

At the end of the predetermined time period, the clock-mechanism will bring the stylus 70 into engagement with the recording sheet 51, and at the same instant the clock-mechanism will start the motor 131, and through the described gear connections will drive the pinion 138, the crown-gear 139 and the interrupted gear 153. At the beginning of this movement, the interrupted portion 154 thereof will be opposite the gear-wheel 155, but immediately thereafter gear-wheel 153 will mesh with wheel 155 and will rotate shaft 39, and through driving pulley 44 will move the recording mechanism to the left in Fig. 1 to its initial point, thereby making the mark for the energy consumption during the just ended predetermined time period. If there is further rotation of the pulley 44, the cord 77 will slip on the pulley. When the interrupted portion 154 of gear-wheel 153 is again opposite gear-wheel 155, the motor 131 will be stopped by the clock-mechanism.

During the recording operation, the motor 131 has also rewound the spring 121. This has been effected through the worm 147 and worm-wheel 148 rotating shaft 112, and sleeve 120, the spring 121 rotating with the sleeve, and thereby being wound. During this action, due to the slippage of gear-wheel 37 and the locking of the worm 13, the meter has been protected from either damage or disturbance by the operation of the recording mechanism.

In Fig. 4, is shown, partially diagrammatically, the clock-controlled mechanism and in its essential features it is the same as that in my copending application, Ser. No. 708,309, hereinbefore referred to. In this mechanism, however, the motor is used to wind the spring drive mechanism already described which positions the recording device pursuant to the energy consumption during the predetermined time period, which operation is performed by the meter in said earlier copending application. The motor also drives the recording device during the making of the record as in the preceding case.

In the embodied control mechanism, a three-armed lever 170 is pivoted at 171, and has at one end thereof a pin 172, which normally holds open the spring switch 173 of the circuit 174 of the motor 131. The lever 170 is impelled to the circuit-closing position by the action of a spring 175. Another arm 177 of the lever 170 engages with the bent end 176 of the lever 81 of the recording mechanism, already described, and a spring 178 tends to press the recording device 70 in operative position against the record sheet. The third arm 182 of the lever 170 is in operative relation with the clock mechanism 183. Cooperating with the arm 182 is a wheel 184, having regularly spaced-apart pins 185 projecting from the side face thereof, these pins being adapted to hold the lever 170 in the open-circuit position against spring 175. Wheel 184 is fastened on a shaft 187, on which is fixed also a pinion 188, which is in mesh with a wheel 189, fixed on a shaft 190. Loose on shaft 190 is a bent pawl lever 191, on which is pivoted a pawl 192, which engages with the teeth of the wheel 189. The other end of lever 191 is in operative relation with a cam 195, fixed on a shaft 196. Fixed also to shaft 196 is a crown-gear 197, which meshes with a pinion 198, fixed on the shaft 137, which shaft is driven by the motor 131, as already described. A spring 200 holds lever 191 to its cam.

The control and release by the clock comprises a cam 207, fixed on a shaft 208 of the clock mechanism. In operative relation with cam 207 is a lever 209, loosely mounted on shaft 187, and acted on by a tension spring 206, and having a pawl 210, this pawl cooperating with a ratchet-wheel 211, fixed to the pin-carrying wheel 184.

This mechanism operates substantially the same as that in my copending application Ser. No. 708,309, with the differences previously noted. The operation may be summarized as follows:

During the predetermined metering time interval, the mechanism is in the position of Fig. 4, and cam 207 is rotated in the clockwise direction, and pawl 210 is moved backwardly behind the next tooth of rachet 211. At the end of the predetermined time interval, lever 209 rides off the high part of cam 207, and under the action of spring 206, pawl 210 will move wheel 184 so that the pin 185 in engagement with lever 170, will move past, and thereby release the lever which is then moved in the clockwise direction by spring 175. Spring switch 173 is thus closed, and recording device 70 is moved against the record sheet by spring 178. The motor 131 now drives shaft 137, which both actuates the recording device 70 to make the energy-measuring mark on the record sheet, and also winds up the spring motor 120. The motor 131 also rotates crown-gear 197 and therewith cam 195, which gradually swings lever 191, so that pawl 192 retracts idly in the clockwise direction on the teeth of wheel 189. At the end of the recording movement, the lever 191 rides off the high part of cam 195, and spring 200 retracts the lever, thereby rotating wheel 189, and therewith the pin-carrying wheel 184. The next pin 185 is thus brought against the arm 182 of lever 170 rocking it sufficiently to open the switch 173, thereby stopping the motor 131 and permitting the recording device 70 to move away from the recording sheet, after having completed the recording mark. The mechanism is then again in the position shown in Fig. 4.

In Fig. 5 a modification is shown including a device to indicate the highest maximum demand during a protracted total time period independently of the record sheet. As embodied, a slide 221 is mounted in a guideway 222 in the plate 87, and may have an additional scale 223. The slide 221 is provided with a pin 224 which is engaged by the recording device, and thereby the slide 221 moves to the extreme limit of movement of the recording device on its longest travel during any of the predetermined time intervals.

In Fig. 6 is shown a mounting of the mechanism in a casing 225 having independent compartments, which may have independent covers and locks or seals. The meter mechanism is shown in one compartment, and the recording mechanism in another compartment with a wall 226 therebetween, the shaft 15, passing through the wall. Thus either the meter or the recording mechanism can be rendered independently accessible to various persons without rendering both accessible to any one person. Also, by reason of the friction drive connections, both mechanisms are protected from interference by anyone having access to the other instrument. The record sheet is usually inspected after predetermined periods, say a week or month, but the meter will continue to register uninterruptedly and protected from any interference by any person having access to the recording mechanism.

From all the foregoing it will be understood that a mechanism has been provided embodying and realizing the objects and advantages set forth, together with other objects and advantages; and it will be further understood that changes may be made in the particular mechanism of the present embodiment without sacrificing its chief advantages, and without departing from the principles of the invention.

What I claim is:—

1. An energy metering and recording mechanism including in combination a meter, a recording device positionable proportionately to the energy consumption during a predetermined time interval, driving means for the recording device acting thereon throughout a predetermined time period, and connections whereby the meter controls the action of the driving means to position the recording device proportionately to the energy metered and a worm driven by the meter and worm wheel driving the recording device to protect the meter from disturbance by the driving means.

2. An energy metering and recording mechanism including in combination a meter, a recording device positionable proportionately to the energy consumption during a predetermined time interval, a power device, means whereby the power device impels the recording device, connections whereby the meter controls said positioning of the recording device throughout a predetermined time period proportionally to the energy consumed, and means whereby the power device causes the recording device to make a record showing the consumed energy.

3. An energy indicating and recording mechanism including in combination a meter, indicating means positioned proportionately to the energy consumption during a predetermined time period, a spring motor and connections therefrom for impelling the indicating means, and connections to the meter for controlling said impelling means throughout the predetermined time period proportionally to the energy metered, and means for protecting the meter from disturbance by the spring motor.

4. An energy indicating and recording mechanism including in combination a meter, indicating means positioned proportionately to the energy consumption during a predetermined time period, a spring motor and connections therefrom for impelling the indicating means, clock mechanism for controlling the action of the spring motor on the indicating means, and connections to the meter for controlling the impelling means throughout the predetermined time period proportionally to the energy metered.

5. An energy indicating and recording mechanism including in combination a meter, indicating means positioned proportionately to the energy consumption during a predetermined time period, a spring motor and connections therefrom for impelling the indicating means, and connections to the meter for controlling the impelling means throughout the predetermined time period proportionally to the energy metered, and power means for causing the indicating means to make a record on a record receiving member of the energy consumed during said time period.

6. An energy metering and recording mechanism including in combination a meter, a record sheet, a recording device moving free from the record sheet during a predetermined time interval, driving means impelling said recording device through said time interval, connections whereby the meter controls the action of the driving means throughout the said time interval to position the recording device proportionately to the energy meter, and separate power-driven means for effecting a record of the energy consumption on said sheet at the end of the predetermined time interval.

7. An energy metering and recording mechanism including in combination a meter, a record sheet, a recording device moving free from the record sheet during a predetermined time interval, driving means impelling said recording device through said time interval, connections whereby the meter controls the action of the driving means throughout the said time interval to position the recording device proportionately to the energy meter, and means for effecting a record of the energy consumption on said sheet at the end of the predetermined time interval and during the return movement of the recording device to initial position.

8. An energy metering and recording mechanism including in combination a meter, a record sheet, a recording device moving free from the record sheet during a predetermined time interval, driving means impelling said recording device through said time interval, connections whereby the meter controls the action of the driving means throughout the said time interval to position the recording device proportionately to the energy meter, and separate power-driven means for effecting a record of the energy consumption on said sheet at the end of the predetermined time interval and during the return movement of the recording device to initial position.

9. An energy recording device including in combination a meter, recording means, a spring motor to drive the recording means, means for controlling the driving of the recording means in accordance with the operation of the meter whereby the quantity measured by the meter is indicated by the recording means, and means for periodically resetting the recording means.

10. An energy metering and recording mechanism including in combination a metering element, a recording device to be moved in accordance with energy consumption during predetermined time intervals, a motor to move the recording device under control of the metering element, and means for controlling movement of the recording device by the motor in accordance with movement of the metering element.

11. An energy metering and recording mechanism including in combination a metering element, a recording device to be moved in accordance with energy consumption during predetermined time intervals, a motor to move the recording device under control of the metering element, means for controlling movement of the recording device by the motor in accordance with movement of the metering element and a friction clutch between the motor and recording device for preventing movement of the recording device except in accordance with movement of the metering element.

In testimony whereof, I have signed my name to this specification.

RICCARD PUDELKO.